(12) United States Patent
Rizzo et al.

(10) Patent No.: US 11,400,635 B2
(45) Date of Patent: Aug. 2, 2022

(54) MULTI-LAYER BLOW MOLDED ARTICLE WITH FUNCTIONAL VISUAL AND/OR TACTILE EFFECTS

(71) Applicant: The Procter & Gamble Company, Cincinnati, OH (US)

(72) Inventors: Nicole Ashley Rizzo, Cincinnati, OH (US); Andrew Joseph Horton, Middletown, OH (US); Joseph Craig Lester, Liberty Township, OH (US); Philip Andrew Sawin, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 135 days.

(21) Appl. No.: 16/720,036

(22) Filed: Dec. 19, 2019

(65) Prior Publication Data

US 2020/0198212 A1 Jun. 25, 2020

Related U.S. Application Data

(60) Provisional application No. 62/781,793, filed on Dec. 19, 2018.

(51) Int. Cl.
*B29C 49/22* (2006.01)
*B29C 49/06* (2006.01)

(52) U.S. Cl.
CPC ...... *B29C 49/06* (2013.01); *B29C 2949/0724* (2022.05); *B29C 2949/0768* (2022.05);
(Continued)

(58) Field of Classification Search
CPC .. B32B 1/02; B32B 7/02; B32B 3/263; B32B 2307/538; B32B 2307/732; B65D 1/0215; B65D 1/40; B29C 49/06; B29C 49/4252; B29C 2795/002; B29C 49/221; B29C 2049/228; B29C 49/0073;
(Continued)

(56) References Cited

U.S. PATENT DOCUMENTS 2,669,752 A 2/1954 Pratt
3,674,512 A 7/1972 Andros
(Continued)

FOREIGN PATENT DOCUMENTS

EP 0553845 B1 4/1998
EP 2832654 A1 2/2015
(Continued)

OTHER PUBLICATIONS

U.S. Appl. No. 16/720,044, filed Dec. 19, 2019, Nicole Ashley Rizzo et al.
(Continued)

*Primary Examiner* — Monica A Huson
(74) *Attorney, Agent, or Firm* — Steven Robert Chuey; David M Weirich

(57) ABSTRACT

Blow molded articles having a predetermined feature incorporated into the wall provided by variations in the thickness of the wall of the article corresponding to a predetermined pattern etched into the perform from which the article was formed. Also, etched performs for making blow molded articles and methods for making such performs and articles.

6 Claims, 11 Drawing Sheets

(52) U.S. Cl.
CPC .. *B29C 2949/0773* (2022.05); *B29C 2949/08* (2022.05); *B29C 2949/0811* (2022.05); *B29C 2949/3008* (2022.05); *B29C 2949/3016* (2022.05); *B29C 2949/3028* (2022.05); *B29K 2995/0018* (2013.01)

(58) Field of Classification Search
CPC .............. B29C 2795/007; B29C 49/24; B29C 2795/00; B29B 11/14; B29B 2911/14344; B29B 2911/1496; B29B 2911/14343; B29B 2911/14406; B29B 2911/14341; B29B 2911/14966; B29B 2911/143; B29B 2911/1412; B29B 2911/1434; B29B 2911/14946; B29B 2911/1408; B29B 2911/14066; B29B 2911/1444; B29B 2911/14593; B29B 2911/14953; B29B 11/08; B29B 2911/14053; B29B 2911/14146; B29B 2911/14573; B29B 2911/14093; B29B 2911/14345; B29B 2911/14331; B29B 2911/14973; B29L 2031/722; B29L 2031/7158; B29K 2995/0026; B29K 2995/0018
See application file for complete search history.

(56) References Cited

U.S. PATENT DOCUMENTS

| | | | |
|---|---|---|---|
| 4,233,262 | A | 11/1980 | Curto |
| 4,339,409 | A | 7/1982 | Curto |
| 5,312,572 | A | 5/1994 | Horwege |
| 5,840,386 | A | 11/1998 | Hatch et al. |
| 5,894,041 | A | 4/1999 | Cornell |
| 7,763,179 | B2 | 7/2010 | Levy |
| 8,522,989 | B2 | 9/2013 | Uptergrove |
| 2004/0144746 | A1 | 7/2004 | Tanaka et al. |
| 2005/0255269 | A1* | 11/2005 | Jacobs ................ B29C 49/0078 428/35.7 |
| 2006/0131793 | A1 | 6/2006 | Tanaka et al. |
| 2006/0263554 | A1 | 11/2006 | Yamada et al. |
| 2010/0104697 | A1 | 4/2010 | Kriegel et al. |
| 2011/0089135 | A1 | 4/2011 | Simon |
| 2012/0193320 | A1 | 8/2012 | Stanca et al. |
| 2013/0228249 | A1 | 9/2013 | Gill |
| 2015/0352772 | A1 | 12/2015 | Feuilloley et al. |
| 2016/0375608 | A1 | 12/2016 | Pijls |
| 2017/0204251 | A1 | 7/2017 | Agerton et al. |
| 2018/0305064 | A1 | 10/2018 | Lane et al. |
| 2020/0024021 | A1 | 1/2020 | Agerton et al. |
| 2020/0198214 | A1 | 6/2020 | Rizzo et al. |
| 2020/0198830 | A1 | 6/2020 | Rizzo et al. |
| 2020/0198831 | A1 | 6/2020 | Rizzo et al. |
| 2021/0130571 | A1 | 5/2021 | Wang et al. |
| 2022/0127036 | A1 | 4/2022 | Rizzo et al. |

FOREIGN PATENT DOCUMENTS

| | | |
|---|---|---|
| FR | 2916674 A1 | 12/2008 |
| FR | 2898293 B1 | 8/2012 |
| JP | H01257024 A | 10/1989 |
| WO | WO9902324 A1 | 1/1999 |
| WO | WO2005115721 A1 | 12/2005 |

OTHER PUBLICATIONS

U.S. Appl. No. 16/720,047, filed Dec. 19, 2019, Nicole Ashley Rizzo et al.
U.S. Appl. No. 16/720,052, filed Dec. 19, 2019, Nicole Ashley Rizzo et al.
U.S. Appl. No. 16/720,056, filed Dec. 19, 2019, Nicole Ashley Rizzo et al.
U.S. Appl. No. 16/720,072, filed Dec. 19, 2019, Nicole Ashley Rizzo et al.
International Search Report and Written Opinion; Application Ser. No. PCT/US2019/067319, dated Apr. 7, 2020, 18 pages.
All Office Actions; U.S. Appl. No. 16/720,044.
All Office Actions; U.S. Appl. No. 16/720,047.
All Office Actions; U.S. Appl. No. 16/720,056, filed Dec. 19, 2019.
All Office Actions; U.S. Appl. No. 16/720,052, filed Dec. 19, 2019.
All Office Actions; U.S. Appl. No. 16/720,072, filed Dec. 19, 2019.
All Office Actions; U.S. Appl. No. 17/569,576, filed Jan. 6, 2022.
All Office Actions; U.S. Appl. No. 17/703,123, filed Mar. 24, 2022.
Anonymous: "Color difference -Wikipedia", Jan. 1, 2005 (Jan. 1, 2005), pp. 1-5, XP05533558, Retrieved from the Internet:URL:https://en.wikipedia.org/wiki/Color difference.
U.S. Appl. No. 17/703,123, filed Mar. 24, 2022, to Joseph Craig Lester et al.

* cited by examiner

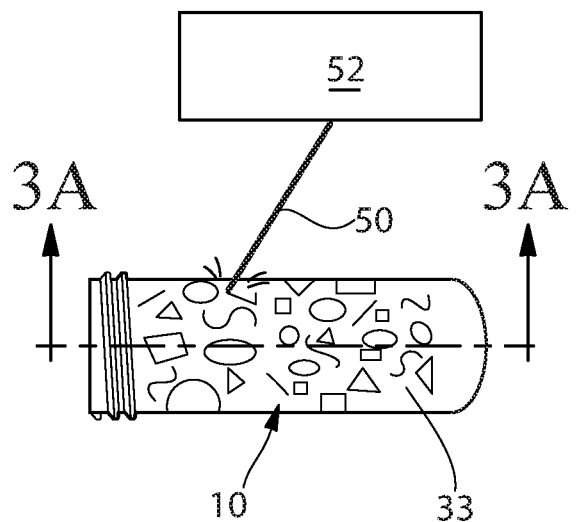
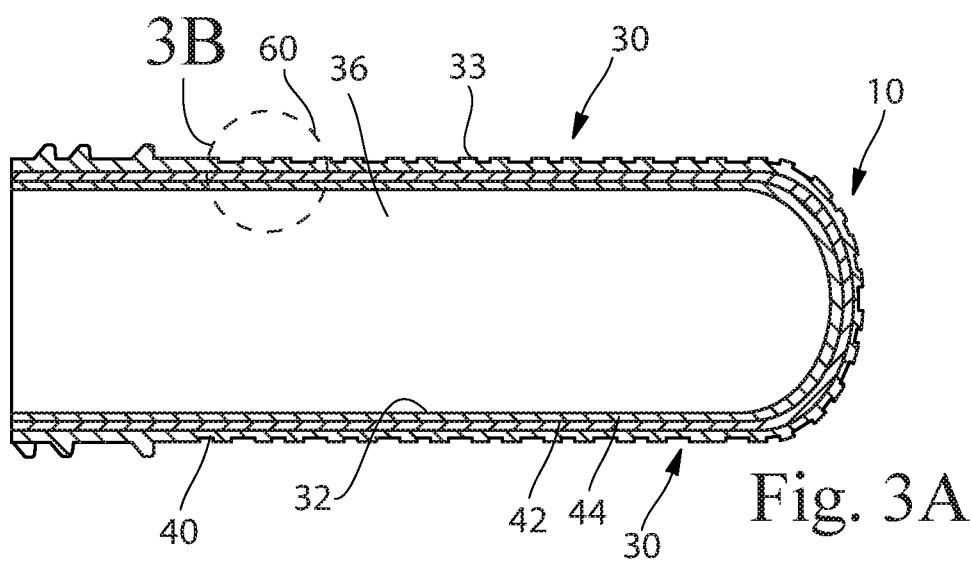
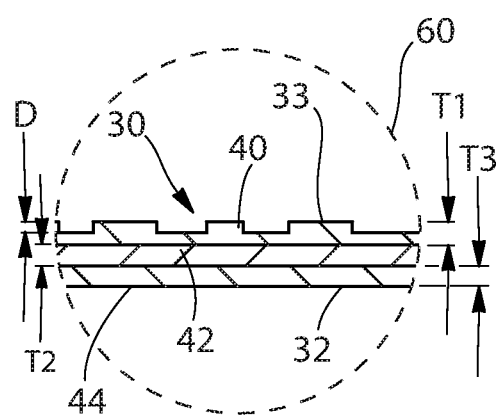

MULTI-LAYER BLOW MOLDED ARTICLE WITH FUNCTIONAL VISUAL AND/OR TACTILE EFFECTS

FIELD OF THE INVENTION

The present invention relates to blow molded articles, performs for blow molded articles, and methods for making such articles and performs.

BACKGROUND OF THE INVENTION

Blow molded articles made of thermoplastic materials are popular in various industries, including the consumer goods and food industries. For example, containers such as bottles for liquid products are often made via blow molding. During the blow molding process, a perform is expanded in a mold, generally with air or another gas under high pressure, to form the resulting article. For certain articles, stretch blow molding is used where the perform is softened and/or stretched while in the mold prior to being expanded into the final article.

Although blow molding has been found to be an effective and efficient process for manufacturing articles such as containers and the like, the requirements of the process can make it difficult to provide articles with certain aesthetic, functional, and/or tactile qualities or characteristics. For example, it may be desirable to provide an article with a textured outer surface, an appearance of a textured outer surface with a smooth outer surface (e.g. to ensure a label can be easily applied thereto), and/or different colors, indicia, decoration and/or text visible when looking at the outer surface. However, the blow molding process often limits the available options for the appearance of the outer surface of the article because of how performs are formed, the high cost of the molds for the blow molding process and the processing requirements needed to blow the perform into the final article.

Thus, it would be desirable to provide improved aesthetic, functional, and/or tactile features on blow molded articles. It would also be beneficial to provide an improved process for manufacturing blow molded articles to allow for a greater range of aesthetic, functional, and/or tactile features. It would also be desirable to provide an improved method of forming performs for blow molded articles that allows the resulting blow molded articles to have a greater range of aesthetic, functional, and/or tactile features and/or to allow the tactile, functional, and/or aesthetic features to be changed quickly and cost effectively. Further still, it would be desirable to provide improved aesthetic, functional, and/or tactile features on blow molded articles while keeping the process simple, cost-effective and scalable to mass manufacture and allowing for the resulting articles to have portions or all of the outer surface smooth so as to allow for easy attachment of a label.

SUMMARY OF THE INVENTION

The present invention provides a solution for one or more of the deficiencies of the prior art as well as other benefits. The specification, claims and drawings describe various features and embodiments of the invention, including a multi-layer blow molded article formed from a perform etched in a predetermined pattern. The article comprises a neck forming an opening; a body portion extending from the neck to a base, the body portion including one or more walls surrounding an interior space in fluid communication with the opening, the one or more walls having an article inner surface, an article outer surface, and a thickness; a predetermined feature incorporated into at least a portion of the one or more walls, wherein the predetermined feature is provided by variations in the thickness of the one or more walls corresponding to the predetermined pattern.

Also disclosed is a multi-layer perform for blow molding formed from a thermoplastic material, the perform comprising a body having one or more walls and an opening, wherein at least a portion of the body includes an etched portion having at least some of the thermoplastic material removed in a predetermined pattern.

BRIEF DESCRIPTION OF THE DRAWINGS

FIG. 3 is a plan view of a perform in accordance with the present invention as it is being laser-etched.

FIG. 3A is a cross-sectional view of the perform of FIG. 3 taken through cross-section line 3A-3A.

FIG. 3B is an enlarged view of portion 60 of the perform shown in FIG. 3A.

DETAILED DESCRIPTION OF THE INVENTION

Figure 1:
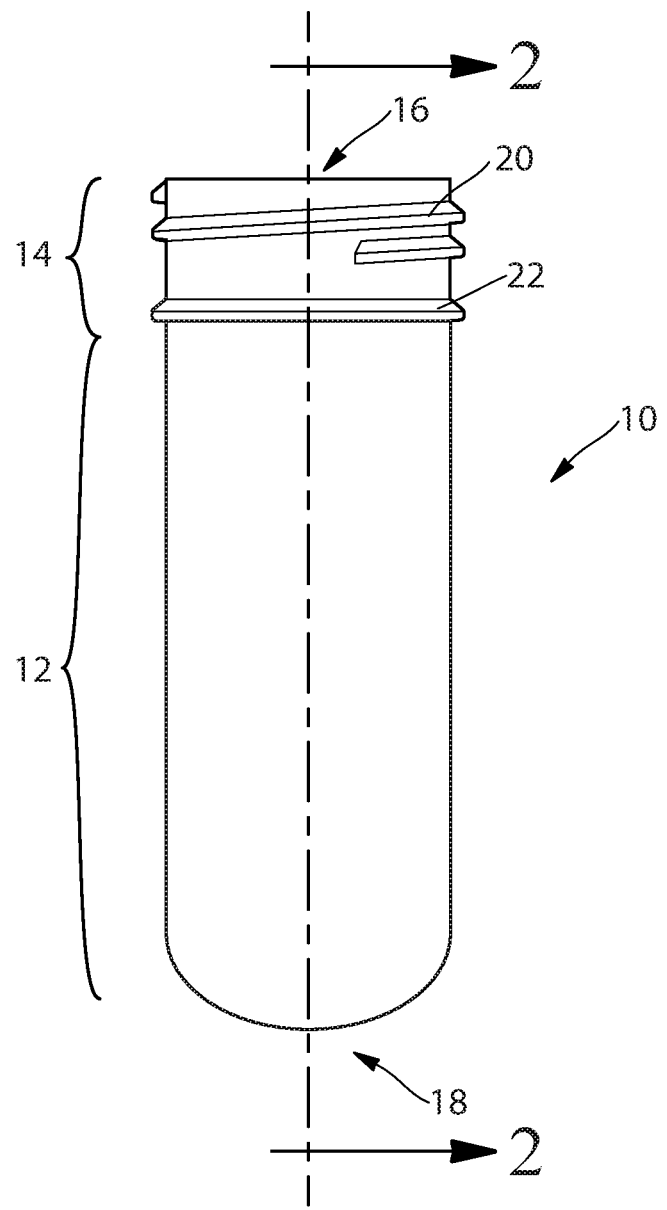
FIG. 1 is a plan view of a perform in accordance with the present disclosure.

"Article", as used herein refers to an individual blow molded hollow object for consumer usage, e.g. a container suitable for containing materials or compositions. The article may be a container, non-limiting examples of which include bottles, tubes, drums, jars, cups, and the like. The compositions contained in such a container may be any of a variety of compositions including, but not limited to, detergents (e.g., laundry detergent, fabric softener, dish care, skin and hair care), beverages, powders, paper (e.g., tissues, wipes), beauty care compositions (e.g., cosmetics, lotions), medicinal, oral care (e.g., tooth paste, mouth wash), and the like. Containers may be used to store, transport, and/or dispense the materials and/or compositions contained therein.

"Blow molding" refers to a manufacturing process by which hollow cavity-containing articles are formed. In general, there are three main types of blow molding: extrusion blow molding (EBM), injection blow molding (IBM), and injection stretch blow molding (ISBM). The blow molded articles of the present invention can be made via IBM and ISBM or any other known or developed blow molding method, all of which are referred to herein simply as blow molding. The blow molding process typically begins with forming a precursor structure or "perform" that is ultimately expanded into the final article. The perform, as used herein, can be any shape or configuration, but is often in the general shape of a tube with at least one open end, or two open ends. Examples of performs include, but are not limited to, parisons (the name often given to precursor structures used in extrusion blow molding), performs, and other precursor structures used in different blow molding techniques. Performs, as used herein, can be formed by extrusion, injection, compression molding, 3D printing and other know or developed methods. Injection molding of the perform can be simple injection molding of a single material, co-injection of two or more materials in a single step and/or over-molding preformed in two or more steps. The injection step can be closely coupled to a blowing step, as in IBM, 1-step ISBM or 1.5-step ISBM, or can be decoupled in a secondary operation such as 2-step ISBM. During blow molding, a perform or other precursor structure is typically clamped into a mold and a fluid, often compressed air, is directed into the perform through the opening to expand the perform to the shape of the mold. Sometimes the perform is mechanically stretched prior to or at the same time the fluid is introduced (known as "stretch blow-molding"). Also, the perform may be heated or cooled before the fluid is introduced. The pressure created by the fluid pushes the thermoplastic out to conform to or partially conform to the shape of the mold containing it. Once the plastic has cooled and stiffened, the mold is opened and the formed article is ejected.

The term "etch" as used herein as a noun, refers to the cavity formed when material is removed from a surface. As a verb, the terms "etch" and "etching" refers to the act of removing material from a surface. Etching can be performed mechanically, chemically and thermally (e.g. laser). Although there is no specific limitation on the maximum or minimum depth of an etch, etching depths are typically in the range of about 0.001 mm to about 2.0 mm, including any depth within the range, such as for example, 0.010 mm, 0.075 mm, 0.100 mm, 0.200 mm, 0.300 mm, 0.400 mm, 0.500 mm, 1.0 mm, 1.5 mm and others.

The term "layer" in the context of the present invention means a thickness of material that is generally continuous and typically homogeneous in terms of its chemical makeup. However, it is contemplated that any particular layer may have discontinuities and/or non-homogeneous materials or regions in certain configurations.

The term "translucent" as used herein means the material, layer, article, or portion of the article being measured has total luminous transmittance of greater than 0% and less than or equal to 90%. The term "transparent" as used herein means the material, layer, article, or portion of the article being measured has total luminous transmittance of 90% or more. The term "opaque" as used herein means the material, layer, article, or portion of the article being measured has total luminous transmittance of 0%. The total luminous transmittance is measured in accordance with Perform:

As noted above, performs are commonly used in blow molding processes. An exemplary perform 10 is shown in FIG. 1. The perform 10 has a body 12, and at least one open end 16 having an opening 34. The perform 10 may also include a neck or finish 14, and a closed end 18 disposed opposite of the open end 16. The finish 14 of the perform 10 may include one or more threads 20 or other structures that can be used in the resulting article to engage with a cap or other closure device. The neck 14 can also include a transfer ring 22 or other structure that can aid in the manufacturing process.

The perform 10 can be used in a blow molding process to provide a preliminary structure that can be transformed into a final article, such as a bottle, by means of directing a pressurized fluid into the open end 16 of the perform 10 while the perform 10 is disposed in a mold in the shape of the final article (or an interim article). Typically, the perform 10 may be heated or otherwise manipulated mechanically or chemically to soften the material of the perform 10 prior to introduction of the pressurized fluid to allow the perform 10 to expand into the shape of the mold without shattering or cracking. More details relating to exemplary blow molding processes in accordance with the present invention are described below.

Figure 2:
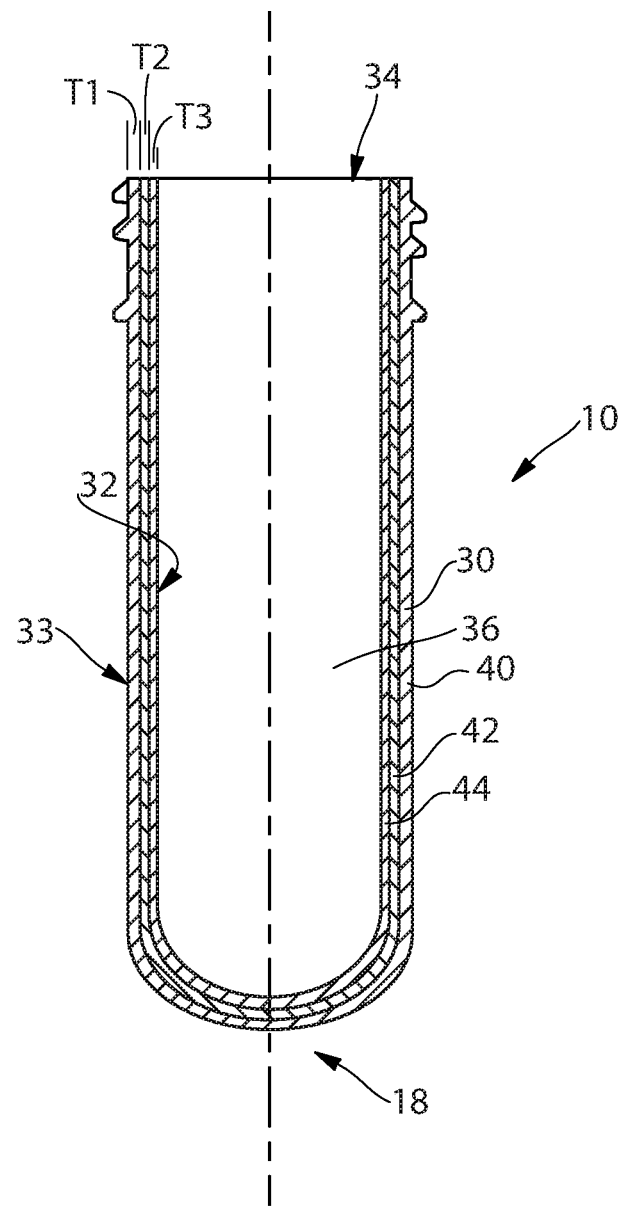
FIG. 2 is an enlarged cross-section view of the perform of FIG. 1 taken through 2-2.

Generally, the perform 10 is formed separately from the blow molding step. The perform 10 can be formed by any suitable method, including but not limited to molding, extrusion, 3D printing, or other known or developed processes. The perform 10 may be formed from a single material or may include layers or regions of different materials. FIG. 2 is an enlarged cross-section of the perform 10 shown in FIG. 1 taken through section line 2-2. As shown, the perform 10 includes one or more perform walls 30, closed end 18 and interior space 36. The perform walls 30 have an inner surface 32 adjacent the interior space 36 and an outer surface 33 forming the exterior of the perform 10. Typically, but not necessarily, the perform walls 30 are between about 1.0 mm and about 6 mm thick. The perform walls 30 are shown as having three layers, outer layer 40, intermediate layer 42 adjacent to, but inward from outer layer 40, and inner layer 44. Although three layers are shown, any number of layers can be used, including a single layer, two or more layers, three or more layers or any other number of layers. Also, although the layers are shown to extend throughout the entire length of the perform 10, any one or more layers may extend only part way through the perform 10. Further, the layers 40, 42 and 44 may each have a thickness, T1, T2 and T3. The thickness T1, T2, and T3 of each layer 40, 42 and 44 may be the same or may be different from one or more of the other thicknesses. The layers 40, 42 and 44 may be made of the same material or different materials. They may also be the same or different colors or have the same or different luminous transmittance. For example, the outer layer 40 may be transparent and the inner layer 44 or intermediate layer 42 may have a color or be translucent or opaque, although any other combinations of layers with the same or different luminous transmittance are contemplated. By including layers with different colors and/or different luminous transmittance, the article formed from the perform 10 can have interesting and/or unique aesthetic characteristics.

A perform or article according to the present invention may be formed of a single thermoplastic material or resin or from two or more materials that are different from each other in one or more aspects. Where the perform 10 has different layers, the materials making up each of the layers can be the same or different from any other layer. For example, the perform or article may comprise one or more layers of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP) and a combination thereof.

Recycled thermoplastic materials may also be used, e.g., post-consumer recycled ("PCR") materials, post-industrial recycled ("PIR") materials and regrind materials, such as, for example polyethylene terephthalate (PCRPET), high density polyethylene (PCRHDPE), low density polyethylene (PCRLDPE), polyethylene terephthalate (PIRPET) high density polyethylene (PIRHDPE), low density polyethylene (PIRLDPE) and others. The thermoplastic materials may include a combination of monomers derived from renewable resources and monomers derived from non-renewable (e.g., petroleum) resources. For example, the thermoplastic resin may comprise polymers made from bio-derived monomers in whole, or comprise polymers partly made from bio-derived monomers and partly made from petroleum-derived monomers.

The thermoplastic resin can have a relatively narrow weight distribution, e.g., metallocene PE polymerized by using metallocene catalysts. These materials can improve glossiness, and thus in the metallocene thermoplastic execution, the formed article has further improved glossiness. Metallocene thermoplastic materials can, however, be more expensive than commodity materials.

One benefit of the present invention is that it allows aesthetic, functional and/or textural features to be added to injection blow molded (IBM) articles and injection stretch blow molded (ISBM) articles that could not otherwise be achieved. This is important because such IBM and ISBM can be made from PET, which is often preferred over other materials because PET is more universally recycled than other clear and glossy thermoplastic materials. The present invention allows for IBM and ISBM articles to be made that have smooth outer surfaces and textured inner surfaces which can provide unique and aesthetically pleasing designs. Although EBM articles can be provided with certain textured surfaces, due to the nature of the extrusion blow molding process (typically using PETG), the range of textures is limited, and the resulting products tend to be less easily recycled than IBM and ISBM articles containing only PET. The "G" in PETG refers to glycol modified PET copolymer in which some of the ethylene glycol is replaced with a second glycol, cyclohexane dimethanol (CHDM) and it is generally considered a contaminant in recycling streams and can negatively impact the performance and processability of PET. Thus, improvements in the aesthetic, textural and/or functional features of IBM and ISBM articles is highly desirable.

The perform 10 can be formed by any known or developed method. For example, the perform 10 can be formed by injection, co-injection and/or over-molding as well as less conventional techniques like compression molding, 3D printing or the like. The perform 10 may be formed such that at least a portion of the perform walls 30 includes some texture, e.g. lines, dots, a pattern, and/or indicia, or they may be formed to be smooth. If the perform 10 is formed in a mold and a surface includes texture, it important to ensure the texture does not interfere with removal of the perform 10 from the mold. This can be done by limiting the height, fineness or density of any texture and/or selecting a texture with peaks and valleys that generally run parallel to the direction in which the perform 10 is removed from the mold. For example, it may be required to limit the depth of any texture that creates an undercut perpendicular to the direction of demolding to less than about 50 microns. This is especially true for PET materials which tend to have higher stiffness compared to PP or HDPE materials and thus, may sheer rather deform and rebound during the demolding process. Some of the limitations related to texturing the perform 10 by means of the perform mold can be avoided by the method described herein and/or by 3D printing of the perform.

In accordance with one aspect of the present invention, the outer surface 33 of the perform 10 may be modified after it is formed to change the topology of the outer surface 33. Methods for modifying the outer surface 33 of the perform 10 include, but are not limited to laser-etching, water jets, cold pressing, hot pressing, milling, etc. The outer surface 33 may be modified to form lines, dots, patters, and/or indicia in or on the outer surface 33. FIG. 3 shows an exemplary embodiment of a perform 10 that is being laser-etched by the beam 50 of laser 52, although any other suitable technique may be employed. The laser beam 50 removes a portion of the material forming the outer surface 33 of the perform resulting in a texture on the outer surface 33. It is also contemplated, though, that material may be added to the outer surface 33 to provide the texture, such as predetermined pattern 54. The predetermined pattern 54 may take on any desired shape, including repeating and/or random pattern, lines, dots, curves, letters, numbers or any other desired indicia. Since the modification of the outer surface 33 of the perform 10 takes place after the perform 10 is removed from the mold in which it is formed, there are few, if any, limitations on the particular texture or pattern 54 that can be used. This also allows for different performs 10 from the same mold to have different textures which can significantly reduce the cost of producing articles with different aesthetic, functional and/or textural qualities which, in turn, can make production of small numbers of articles and even customized articles economically feasible.

FIG. 3A is cross-sectional view of the perform of FIG. 3 taken through section line 3A-3A of FIG. 3. The exemplary embodiment shown in FIG. 3 has three layers in the perform wall 30. Layer 40 is the outer layer, layer 42 is the intermediate layer and layer 44 is the inner layer. As can be seen, the laser-etching removes material from the perform 10. Specifically, in the embodiment shown in FIG. 3A, the laser-etching removed portions of the outer layer 40. However, the laser 52 can be used to remove portions of other layers in addition to or instead of the outer layer 40.

FIG. 3B is an enlarged view of a portion 60 of the perform 10 shown in FIG. 3A. As shown, the laser-etching can remove all or a portion of one or more of the layers 40, 42 and 44. The depth D of the laser etching can be the same as or different than the thickness of any layer. For example, the depth D of the laser-etching can be the same as the pre-etching thickness T1 of the outer layer 40 or can be greater than or less than the pre-etching thickness the outer layer 40 and/or any other layer (e.g. pre-etching thickness T3 of inner layer 44 or T2 of intermediate layer 42). The depth D of the etching may be less than the pre-etching thickness T1 of the outer layer 40 if it is desired that the outer layer 40 form the outer surface 33 of the perform 10. Alternatively, the depth D of the etching may be greater than the pre-etching thickness T1 of the outer layer 40 if it is desired for one or more layers other than the outer layer 40 to form a portion of the outer surface 33 of the perform 10. Different depths D of etching can provide different aesthetic, functional, and/or textural features on the resulting blow molded article as can different sizes and shapes of the laser beam 50.

Typically, the depth of the etching is between about 0.001 mm to about 2 mm, but any suitable depth of etching can be used. For example, any etching or portion thereof can be up to about 90% of the thickness of the preform wall 30. In addition to the depth of the etch, the kerf (the slit or notch made by etching), can take any desired shape. For example, the shape of the kerf may follow a gaussian curve, where the kerf is wider at the top and narrower at the bottom. A kerf can also be in the shape of a non-tapered slit with generally vertical walls. Still further, the shape of a kerf can follow other geometries like a reverse taper or barrel shaped taper. The depth of the etch can vary throughout the kerf and/or can be different in different portions of the texture or predetermined pattern 54.

Laser:

As stated above, one method to create predetermined pattern 54 on the perform 10 is laser-etching. Any suitable laser can be used to etch the surface of the perform 10. One example of a laser 52 useful for etching/ablating a perform 10 in accordance with the present invention is a sealed carbon dioxide type laser, having power in the range of 40 W to 2.5 kW, and a laser wavelength of 9 microns to 11 microns, or from 9.4 microns to 10.6 microns. Such lasers are available from various suppliers, including an LPM1000 module, available in 30 LASERSHARP systems from LasX Industries, Inc. of White Bear Lake, Minn., United States. Other makes and types of lasers are also possible and different power ranges and settings may be used. The laser 52 can include optics that can be used to change the energy density and/or spot size of the laser beam, as desired.

Figure 4:
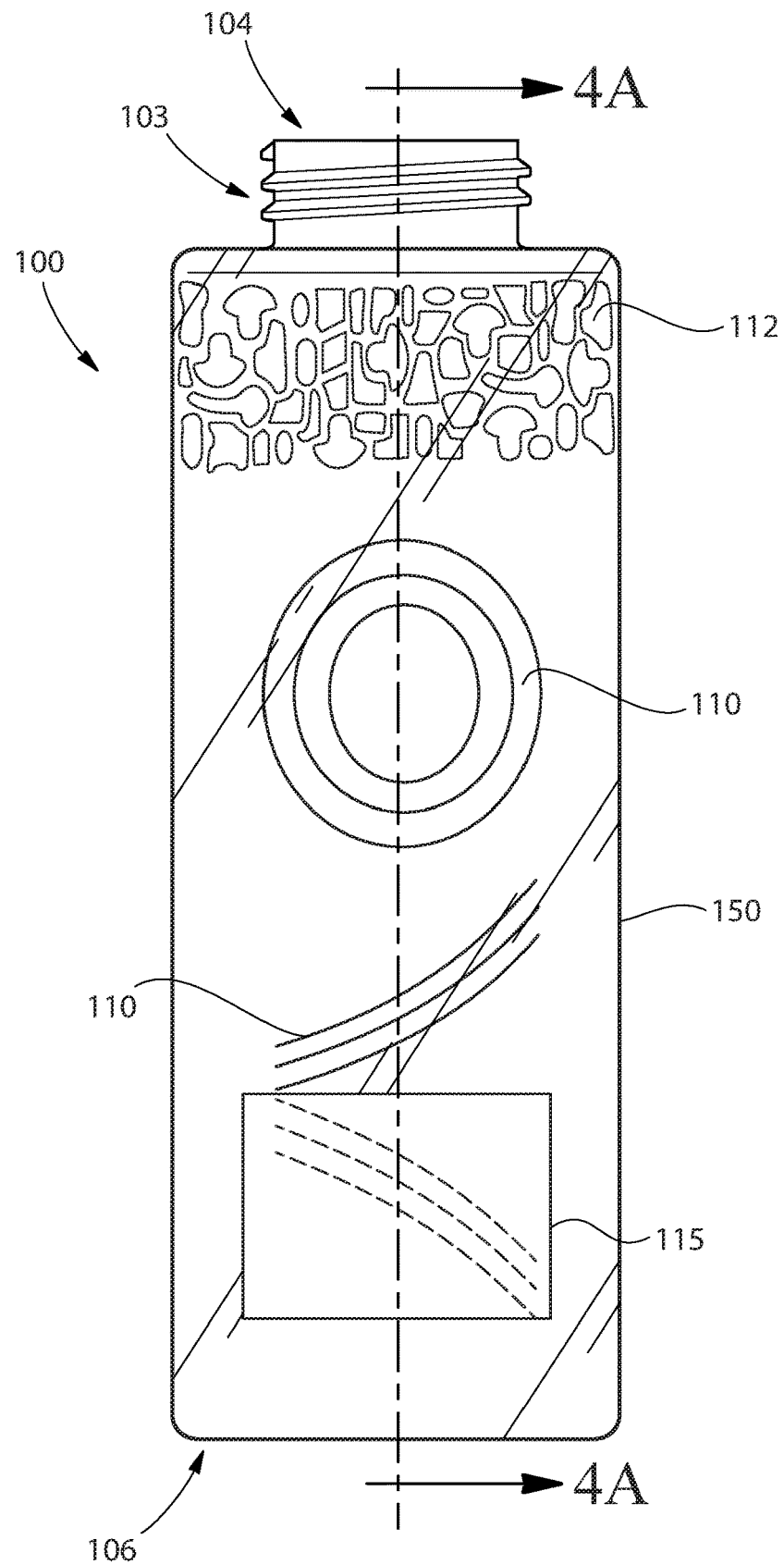
FIG. 4 is a plan view of a blow molded article in accordance with the present invention.
Figure 4A:
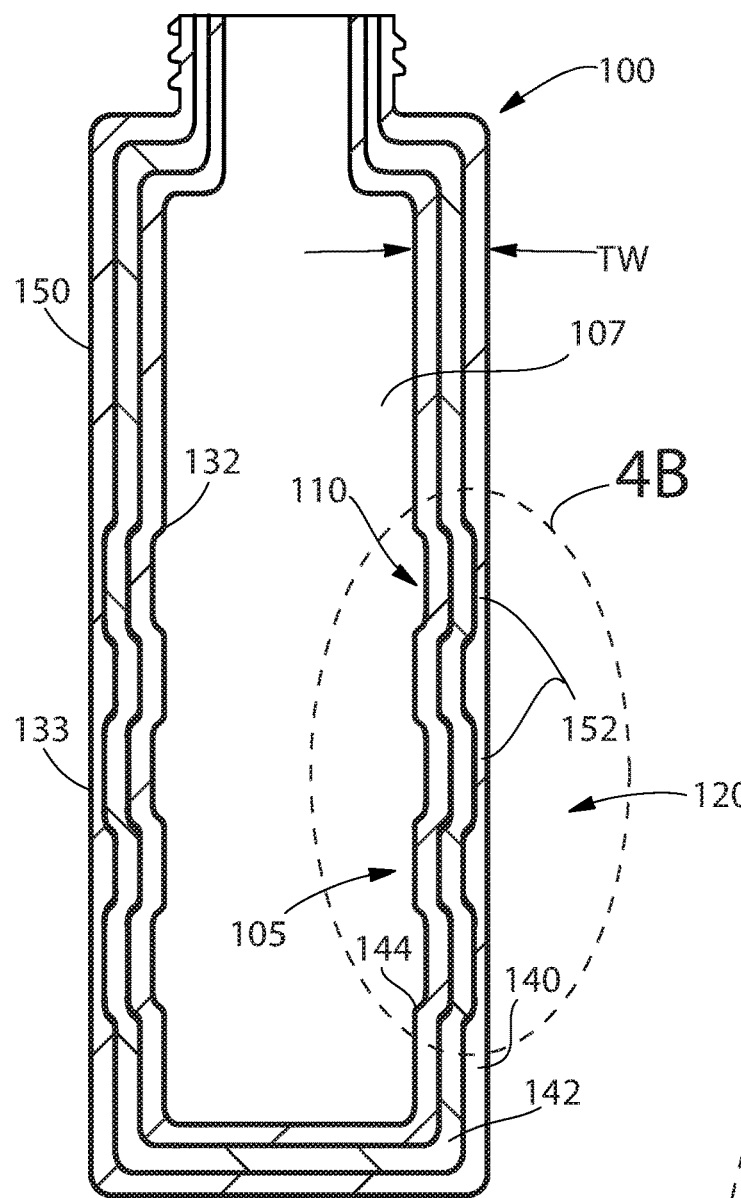
FIG. 4A is cross-sectional view of the perform of FIG. 4 taken through cross-section line 4-4.
Figure 4B:
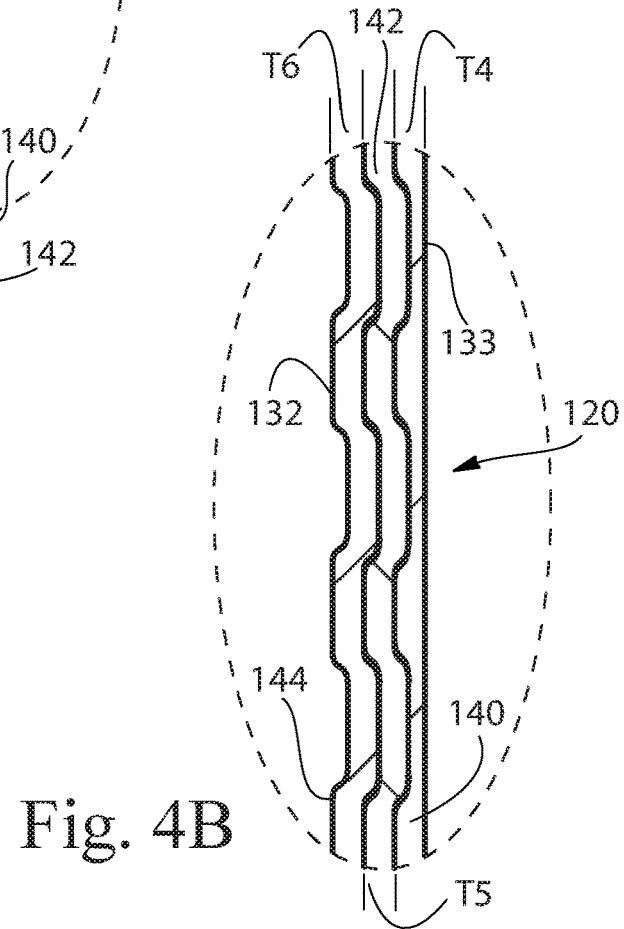
FIG. 4B is an enlarged view of portion 60 of the perform shown in FIG. 3A.
Figures 5, 6:
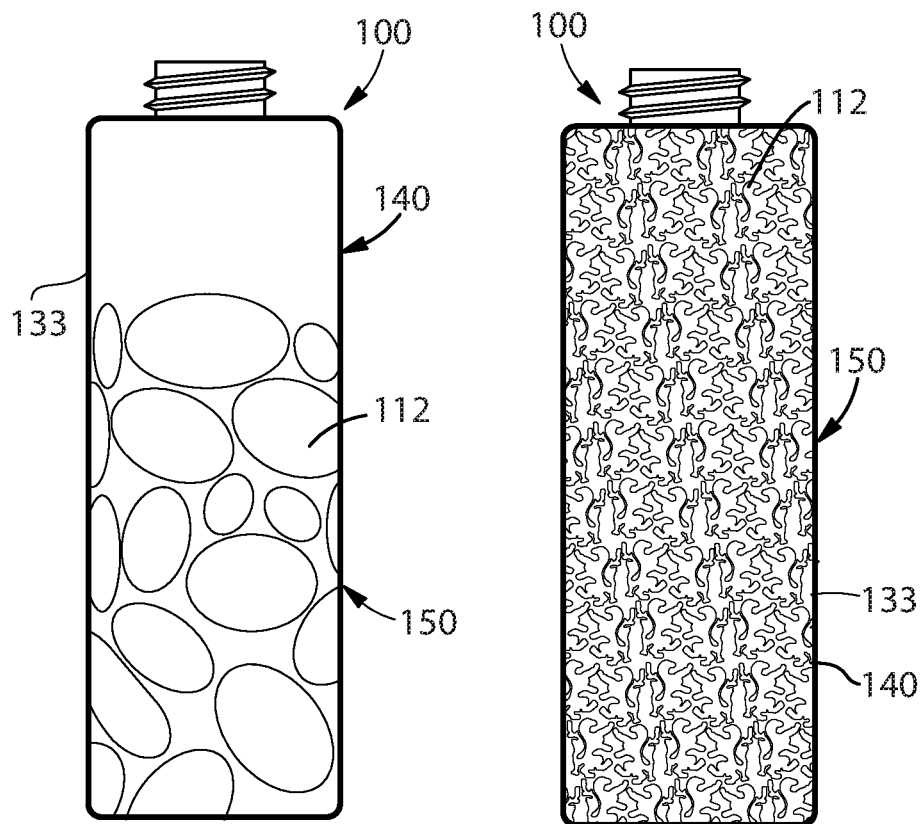
FIG. 5 is a plan view of a blow molded article in accordance with the present invention.
FIG. 6 is a plan view of a blow molded article in accordance with the present invention.

Article:

Blow molded articles in accordance with the present invention may be provided with unique and beneficial characteristics. The characteristics are the result of unique features relating to the structure of the article itself, characteristics of the perform 10, and the method of making the perform and/or blow molded article. FIGS. 4-6 show examples of blow molded articles 100 in accordance with the present invention. As noted above, the present invention can provide aesthetic, functional, and textural features to blow molded articles 100 that were heretofore not attainable and/or not attainable with currently available mass production equipment and technology. For example, as shown in FIG. 4, blow molded articles 100 of the present invention may include one or more article walls 150 surrounding an interior space 107 (shown in FIG. 4A), a neck 103 with an opening 104 in fluid communication with the interior space 107, a base 106, an article inner surface 132, and an article outer surface 133. The article 100 may include a texture 110 on the article inner surface 132 or article outer surface 133 of the blow molded article 100. As shown in FIGS. 5 and 6, blow molded articles 100 in accordance with the present invention may include one or more predetermined features 105, such as aesthetic features 112. Examples of aesthetic features include, but are not limited to patterns, indicia, one or more colors, shading, gradation, appearance of depth, as well as other aesthetic features and combinations thereof. Generally, the aesthetic feature(s) 112 of the article 100 are visible by users under ordinary use conditions. However, embodiments are contemplated wherein the aesthetic feature(s) 112 or portions of the aesthetic feature(s) 112 are visible only under certain circumstances, such as when the article 100 is filled with a product or material, partially filled or when the article 100 is empty or partially empty. Functional features include, but are not limited to, features such as increase or decrease of strength, increase or decrease of flexibility, increase or decrease of coefficient of friction, structure that creates ribs, ramps, protuberances, valleys, or other structures that provide some function to the article 100. The blow molded articles 100 of the present invention may be single or multilayer articles 100. In multilayer articles 100, there may be two or more layers. For example, as shown in FIGS. 4A and 4B, article 100 may have a first layer 140 forming the article outside surface 133 of the article 100, a third layer 144 forming an inside surface 132 of the article 100, and a second layer 142 sandwiched between the first layer 140 and the third layer 144, wherein the layers together make up the entire wall 150 of the article 100 in that region. Generally, the multilayer region (i.e. the region comprising more than one layer) makes up a major portion or the entirety of the article 100 wall 150 surface, but embodiments are contemplated wherein at least a portion of the article 100 includes fewer than all of the layers disposed in at least another region of the article 100. For example, one or more of the layers may not extend the entire distance from the neck 103 to the base 106 of the article 100.

The walls 150 of the article 100 can be any suitable thickness. For example, the wall thickness TW (shown in FIG. 4A) may range from about 0.1 mm to about 3.0 mm, although other thicknesses are possible depending on the particular process used and the desired end result. Also, the relative thickness of the layers, if any, can be different from each other and can vary throughout the particular layer. That is each of the layers may have a thickness that is different from the other layers or some or all may have thicknesses that are approximately the same. Generally, each layer is somewhere between 5% and 100%, 5% and 75%, 5% and 50%, or 5% and 40% of the total thickness of the article wall. And, as noted above, different portions of the walls 150 and/or layers may have different thicknesses, as desired.

One or more of the layers or portions of any layer in the blow molded article 100 may be transparent, translucent or opaque. Likewise, one or more of the layers or portions thereof may include one or more pigments or other color-producing material. In such instances, one or more of the layers may be visible through one or more of the other layers. The presence of a smooth transparent outside layer can help allow for pigments in other layers to be visible from outside of the article 100 and can at the same time provide the article 100 with gloss. Without being bound by theory, it is believed that the presence of a glossy surface at a distance from a translucent or opaque layer that includes pigments can create an effect of "depth" which can contribute to a premium appearance of the article itself. It can also give the appearance that the article 100 is made from glass or a material other than a thermoplastic material.

One especially advantageous and unique aspect of the present invention is that it allows for blow molded articles 100 to be formed with a visual impression of texture on the article outer surface 133 of the article 100, even where the article outer surface 133 or portions thereof are smooth relative to the texture or visual impression of texture. As shown in FIG. 4, a relatively smooth article outer surface 133 with visually-apparent texture may be, for example, achieved when the texture 110 is formed on the inner surface 132 of the article 100, and at least a portion of the one or more layers of the wall 150 of the article 100 is/are transparent or translucent. A smooth article outer surface 133 can be advantageous, for example, when applying a label 115 to a portion of the article outer surface 133 of the article 100, especially when the label 115 is intended to adhere to the article outer surface 133, such as, for example, pressure sensitive labels, shrink labels, direct object printing, wrap around labels, screen printing, in-mold labels, transfer labels, pad printing and any other labels, printing or materials placed on or adjacent the outer surface 133. A smooth article outer surface 133 can also be desirable when the article outer surface 133 is to be printed, when a shrink label is used, and/or for other reasons, including "feel", processing, look, etc.

As shown in FIGS. 4A and 4B, the article 100 may have a predetermined feature 105, such as texture 110 disposed on a portion 120 of the article 100. The texture 110 may create all or a portion of an aesthetic feature 112, as set forth herein. In the example shown, the texture 110 is disposed on the inner surface 132 of the article, but embodiments are contemplated wherein the texture 110 is disposed on the article outer surface 133 and or both the article inner surface 132 and the article outer surface 133. The texture 110 is shown as being created by variations in the thickness T6 of the inner layer 144 of the article. The predetermined feature 105 can also provide a functional feature such as a rib, rifling or other structure. The texture 110 is the result of the etching done to the perform 10 that was used to form the article 100 and the blow molding process itself.

The predetermined feature 105 results from the perform 10 from which the article 100 is made being manipulated prior to expanding the article 100 to its final shape. The predetermined feature 105 may include etched regions 111 and non-etched regions 113. The etched regions 111 correspond to the areas of the article 100 that were etched when the article was a perform 10 and not yet expanded to its final shape. The non-etched regions 113 are regions or the article 100 that correspond to regions of the perform 10 that were not etched prior to being expanded into the final article 100. The etched regions 111 may be flush with or extend inwardly or outwardly from the non-etched regions 113 of the outer surface 133 of the article 133. It may be desirable that if the etched regions 111 extend inwardly or outwardly from the non-etched regions 113, they do so no more than a predetermined amount to provide the outer surface 133 with a particular topography. For example, limiting the inward or outward extension of the etched regions 111 can help provide an outer surface 133 that is smooth to the touch and/or can readily accept printing and/or a label, or other form of decoration.

As shown in FIG. 4B, the article 100 may have a first layer 140 having a first thickness T4, a second layer 142 having a second thickness T5, and a third layer 144 having a third thickness T6. The first layer 140 is disposed outwardly of the third layer 144. The first layer 140 includes thinned regions 152 that are thinner than the thickness T4 of the first layer 140 outside of the thinned regions 152. The thinned region 152 of the first thickness T4 may be less thick than at least a portion of the second thickness T5 and/or third thickness T6 overlying the thinned regions T4. Thus, the predetermined feature 105 may be created by variations in the thickness of one or more of the layers of the article 100 in a predetermined pattern 54. As shown in FIGS. 4A and 4B, the first thickness T4 of the article 100 may vary more than the second thickness T5 of the second layer 142 and/or the third thickness T6 of the third layer 144 through at least a portion of the predetermined feature 105.

Figure 4C:
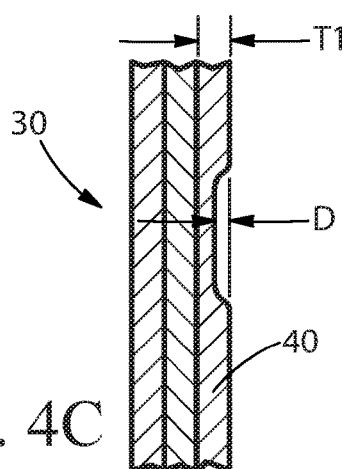
FIG. 4C is an enlarged view of portion of a perform in accordance with the present invention.
Figure 4D:
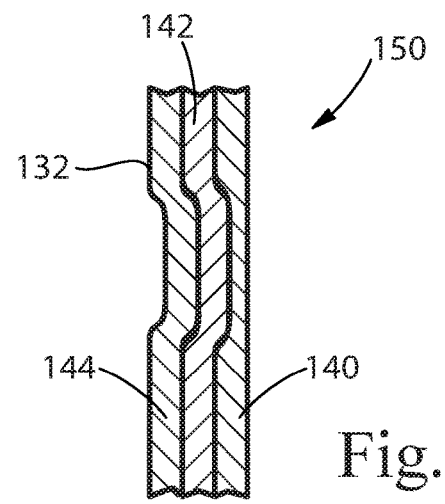
FIG. 4D is an enlarged view of portion of a blow molded article in accordance with the present invention.
Figure 4E:
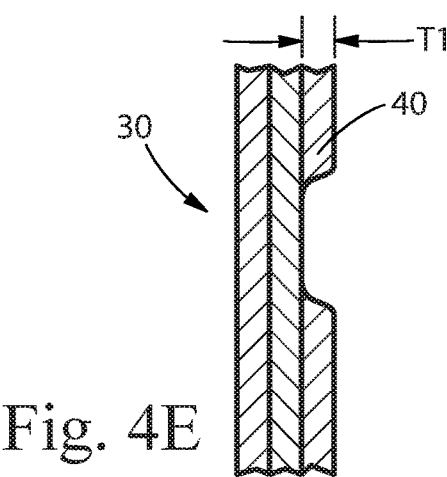
FIG. 4E is an enlarged view of portion of a perform in accordance with the present invention.
Figure 4F:
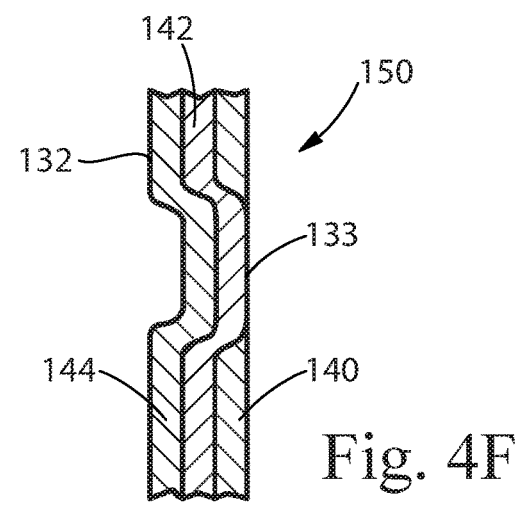
FIG. 4F is an enlarged view of portion of a blow molded article in accordance with the present invention.
Figure 4G:
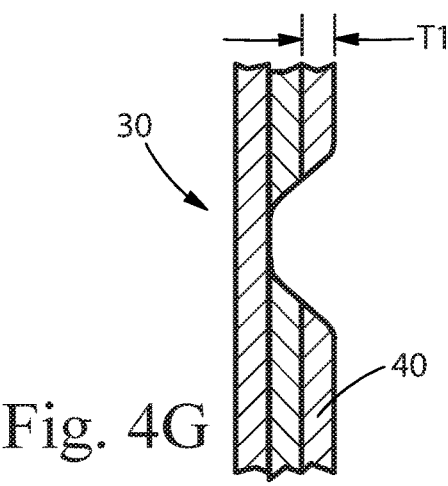
FIG. 4G is an enlarged view of portion of a perform in accordance with the present invention.
Figure 4H:
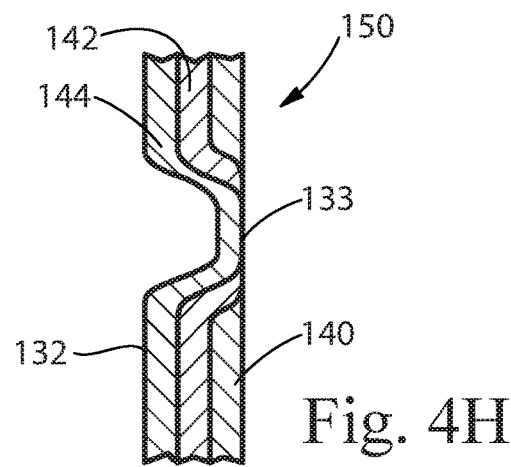
FIG. 4H is an enlarged view of portion of a blow molded article in accordance with the present invention.

FIGS. 4C-H show different examples of how the wall 150 of an article 100 may look due to different etching depths made to the perform 10. FIG. 4C shows the wall 30 of a perform 10 wherein the depth D of the etching is less than the thickness T1 of the outer layer 40. FIG. 4D shows how the wall 150 of an article formed from the perform 10 of FIG. 4C might look after the article 100 is formed. As shown, the portion of the wall 150 shown includes three layers, a first layer 140, a second layer 142 disposed inwardly of the first layer 140 and a third layer 144 that is disposed inwardly of the second layer 142. The first layer 140 has a portion corresponding to the etching of the perform 10 that is thinner than the non-etched portion of the wall 150. FIG. 4E shows the wall 30 of a perform 10 wherein the depth D of the etching is equal to the thickness T1 of the outer layer 40. FIG. 4F shows how the wall 150 of an article formed from the perform 10 of FIG. 4E might look after the article 100 is formed. As shown, the wall 150 shown includes three layers, but the first layer 140 has a portion missing corresponding to the etching of the perform 10. Thus, at least a portion of the outer surface 133 of the article 100 is formed by the second layer 142. FIG. 4G shows the wall 30 of a perform 10 wherein the depth D of the etching is greater than the thickness T1 of the outer layer 40. FIG. 4H shows how the wall 150 of an article formed from the perform 10 of FIG. 4C might look after the article 100 is formed. As shown, the wall 150 includes three layers, but the article outer surface 133 has a portion corresponding to the etching of the perform 10 that is made up of the third layer 144. An article 100 can be formed from any number of layers and can include any number of textural, functional and/or aesthetic features 112 that have characteristics, e.g. different layers visible and/or forming the outer surface 133 of the article 100.

FIGS. 5 and 6 are examples of bottles in accordance with the present invention. FIG. 5 shows an article 100, a bottle, with an aesthetic feature 112 visible on the article outer surface 133. The article has three layers of material forming the wall 150 of the article 100. The outer layer of the article 100 is a different color than the middle layer. The unique aesthetic feature 112 can be attributed to the fact that a portion of an inner layer of the article 100 is visible through the outer layer. The aesthetic pattern 112 is formed by laser-etching the perform used to make the article 100. Specifically, the outer layer of the perform is laser-etched in a predetermined pattern 54 and at a predetermined depth to allow the color of the middle layer of the article 100 to be visible through the outer layer. In the embodiment shown, the first layer 140 includes a material that provides a gloss surface. The article outer surface 133 is generally smooth despite the visual impression of texture provided by the aesthetic feature 112.

The extent to which a particular surface is smooth can be expressed in terms of various different surface topography measurements. Two measurements that have been found to be particularly helpful in characterizing the surface topography of performs and articles in accordance with the present invention are Maximum Peak/Pit Height (Sz) and Root Mean Square Roughness (Sq) as described below in the Measurement Methods section of this specification. For example, it may be desirable to limit the Maximum Peak/Pit Height across some or all of the article outer surface 133 and/or the Root Mean Surface Roughness the to provide a surface that is desirable for printing, and/or labeling, or for other tactile, aesthetic or functional reasons. For example, it may be desirable for the Sz of some or all of the article outer surface 133 to be less than or equal to 750 microns, 500 microns, 250 microns, 200 microns, 150 microns, 100 microns, or 50 microns. Additionally, or alternatively, it may be desirable for some or all of the etched regions 111 to have an Sq of a certain value or below. For example, it may be desirable for some or all of the etched regions 111 to have an Sq of less than or equal to 10 microns, 8 microns, 5 microns, or 2 microns. As a result of the process used to form the predetermined feature 105, such as predetermined pattern 54, the inner surface 132 may have certain topological characteristics as well. For example, some or all of the etched regions 111 of the inner surface 132 may have an Sq of greater than or equal to about 2 microns, 5 microns, 8 microns, or 10 microns and the Sz of some or all of the article inner surface 132 may be greater than or equal to 50 microns, 100 microns, 150 microns, 200 microns, 250 microns, 500 microns, or 750 microns.

FIG. 6 shows an article 100, a bottle, with an aesthetic feature 112 visible on the article outer surface 133. The article has three layers of material forming the wall 150 of the article 100. The outer layer of the article 100 is a different color than the middle layer. The unique aesthetic feature 112 can be attributed to the fact that a portion of an inner layer of the article 100 is visible through the outer layer. The aesthetic pattern 112 is formed by laser-etching the perform used to make the article 100. Specifically, the outer layer of the perform is laser-etched in a predetermined pattern 54 and at a predetermined depth to allow the color of the middle layer of the article 100 to be visible through the outer layer. In the embodiment shown, the first layer 140 includes a material that provides a gloss surface. The article outer surface 133 is smooth relative to the visual impression of texture provided by the aesthetic feature 112. Specifically, the article outer surface 133 or portion thereof that is smooth, for example, may have an Sq of less than or equal to about 10 microns, 8 microns, 5 microns, or 2 microns. Additionally, or alternatively, the article outer surface 133 may have a topography created by the predetermined feature 105 having an Sz that is less than or equal to 750 microns, 500 microns, 250 microns, 200 microns, 150 microns, 100 microns, or 50 microns. As a result of the process used to form the predetermined feature 105, such as predetermined pattern 54, the inner surface 132 may have certain topological characteristics as well. For example, some or all of the etched regions 111 of the inner surface 132 may have an Sq of greater than or equal to about 2 microns, 5 microns, 8 microns, or 10 microns and the Sz of some or all of the article inner surface 132 may be greater than or equal to 50 microns, 100 microns, 150 microns, 200 microns, 250 microns, 500 microns, or 750 microns.

For any multi-layer article 100, the article outer surface 133 may be formed solely by the third layer 144 or may be formed partially by the third layer 144 and at least partially by any other layer. For example, the article 100 may have a wall 150 that has an article outer surface 133 formed mostly by the third layer 144 and partially by another layer. This can be the case when the outer layer 40 of the perform is etched to a depth that an underlying layer is exposed in the final article 100. This can provide the article 100 with unique visual and tactile features as the layers may have different characteristics, such as gloss, translucency, color, feel, etc.

Figure 6A:
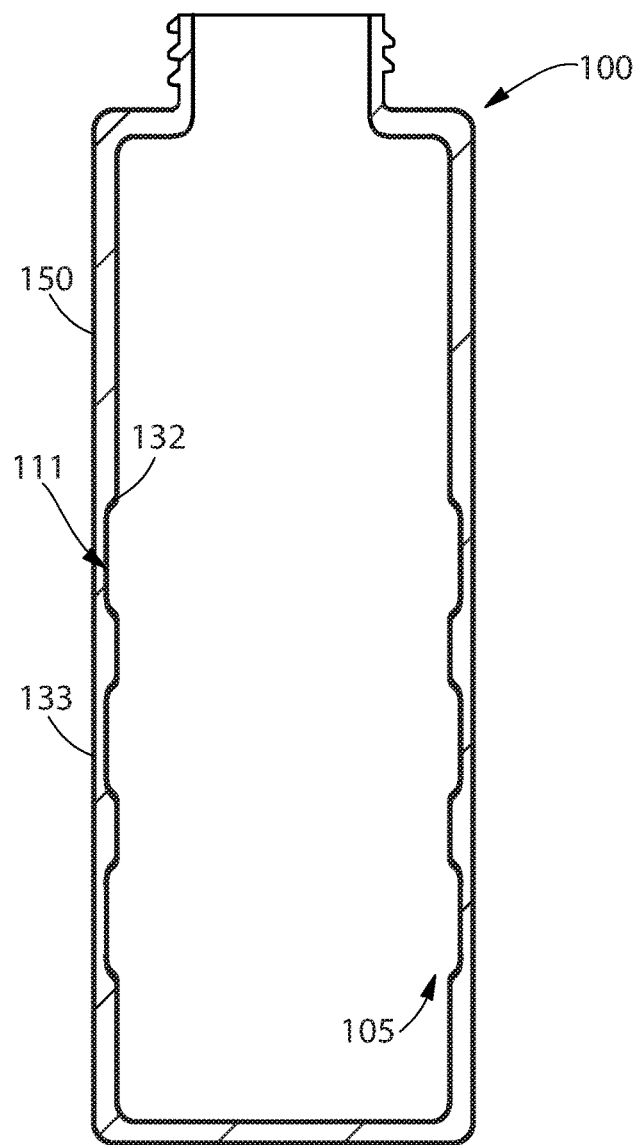
FIG. 6A is a cross-sectional view of a blow molded article in accordance with the present invention.
Figure 6B:
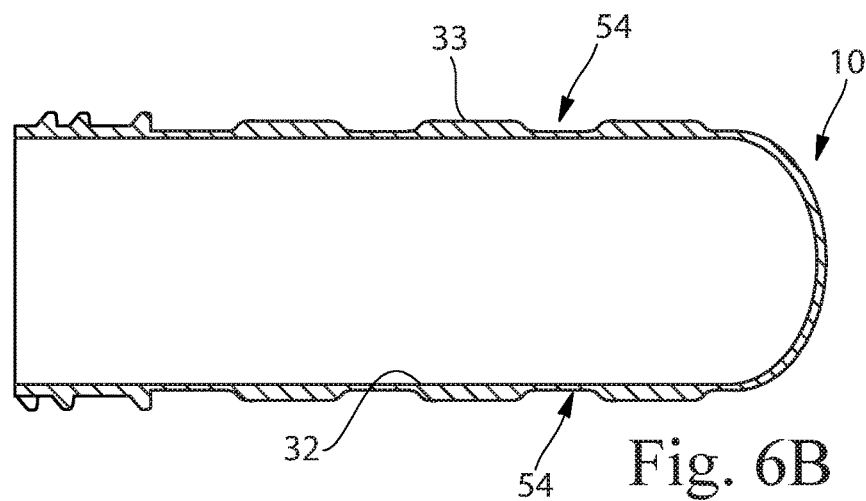
FIG. 6B is a cross-sectional view of a perform for a blow molded article in accordance with the present invention.

Although the above examples are of a multi-layer article, mono-layer blow molded articles are also contemplated. For example, as shown in FIG. 6A, a mono-layered article 100 may be formed from a perform having a thermally-etched predetermined pattern 54. An aesthetic, functional, and/or texture feature may be incorporated into the wall 150 of the article 100 such that it is visible from the exterior of the article 100. The predetermined feature 105 may be formed from variations in the thickness of the wall 150 corresponding to the predetermined pattern 54. The predetermined pattern 54 may include regions or patterns that were ablated from the outer surface 33 or inner surface 32 of the perform 10 (an example of which is shown in FIG. 6B) used to create the article 100, such as, for example, by laser-etching. The mono-layer, laser-etched, blow molded article 100 may have an article outer surface 133 or portion thereof that is smooth, for example, having an Sq of less than or equal to about 10 microns, 8 microns, 5 microns, or 2 microns. Additionally, or alternatively, the article outer surface 133 may have a topography created by the predetermined feature 105 having an Sz that is less than or equal to 750 microns, 500 microns, 250 microns, 200 microns, 150 microns, 100 microns, or 50 microns. As a result of the process used to form the predetermined feature 105, such as predetermined pattern 54, the inner surface 132 may have certain topological characteristics as well. For example, some or all of the etched regions 111 of the inner surface 132 may have an Sq of greater than or equal to about 2 microns, 5 microns, 8 microns, or 10 microns and the Sz of some or all of the article inner surface 132 may be greater than or equal to 50 microns, 100 microns, 150 microns, 200 microns, 250 microns, 500 microns, or 750 microns.

Figures 7A, 7B:
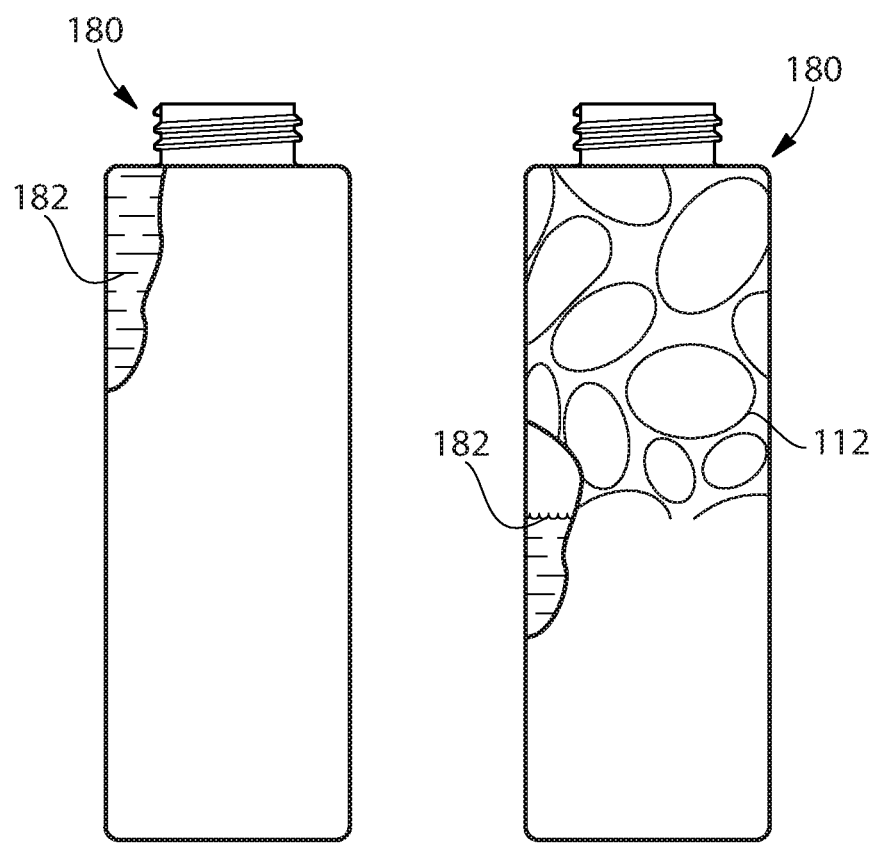
FIG. 7A is a plan view of a blow molded bottle in accordance with the present invention.
FIG. 7B is a plan view of a blow molded bottle in accordance with the present invention.

The article 100 may be a container such as bottle 180 shown in FIGS. 7A and 7B. The bottle 180 may be filled with a composition 182 such as a personal care or home care composition. The bottle 180 may include aesthetic features 112 that are enhanced or mitigated by the presence of the composition 182 in the bottle 180. For example, a composition 182 in a clear bottle 180 with a texture 110 on the article inner surface 132 may result in the texture 110 being more, less or even non-apparent where the composition 182 is disposed adjacent the texture 110 than where it is not. In one example, a white composition 182 in a clear bottle 180 with texture 110 on the inner surface may obscure the pattern of the texture 110 where the composition 82 is disposed adjacent the texture 110. However, the texture 110 may be clearly visible in regions where the composition 182 is not present, for example, the top portion of the bottle 180 when the bottle 180 is less than half-full of the composition 182. Similarly, other forms of color-matching between the bottle-color and the composition-color (e.g. a blue composition in a blue bottle) may result in the aesthetic feature 112 being more or less-apparent during the time the product is sold or used. Alternately, the aesthetic features 112 of the bottle 180 may be enhanced by the composition 182 therein. For example, choosing different colors for the composition 182 and the bottle 180 may result in the texture or aesthetic features 112 being visually enhanced when the composition 182 is in the bottle 180. Often, colors are described in terms of color-saturation (e.g. L in the L, a, b-scale) and hue, but other color characteristics may also affect the aesthetics of the bottle-composition combination.

Another advantage of the present invention is that it can provide for predetermined features 105 to be disposed on the inner surface 132 of the article 100 without the need to alter the inner surface 32 of the perform 10. Such predetermined features 105 may be simple in nature (e.g. straight, parallel lines) or complex (e.g. curved lines, non-parallel lines, dots, shapes, letters, indicia, and combinations thereof). As noted above, by texturing the inner surface 132 of the article 100 as opposed to the article outer surface 133, the article outer surface 133 can present a smooth surface that may be desired for its "feel" or to allow for more efficient and/or effective printing or labeling of the surface. Further, however, the predetermined feature 105 can still provide the article 100 with unique visual, tactile or functional characteristics. For example, if at least a portion of the wall 150 of the article 100 is transparent or translucent, a texture 110 or aesthetic feature 112 can be provided on the inner surface 132 of the article 100 and is visible through the wall 150 of the article. If a colored or opaque composition 182 is included in the article 100, it is possible to have the texture 110 or aesthetic feature 112 appear visually to the user only after some of the composition 182 has been dispensed from the article 100. Also, providing a texture 110 on the inner surface 132 of an article 100 can be used to enhance or otherwise modify a texture 110 or other aesthetic feature 112 that is disposed on the article outer surface of the article or vice-versa.

Beyond purely aesthetic benefits, the predetermined feature 105 may provide the article 100 with one or more functional aspects alone or in addition to any aesthetic or textural feature or benefit. For example, the bottle 180 with a certain aesthetic feature 112 or texture 110 can be paired with a composition 182 such that the aesthetic feature 112 or texture 110 is more of less visible after a certain amount of the composition 182 has been dispensed from the bottle 180. Thus, the manufacturer can incorporate a repurchase reminder or other information into the bottle 180 in ways that were heretofore not available. As such, consumers may find the product to be interesting and/or sophisticated which may drive purchase intent and increase sales. Further, the predetermined feature 105 may, for example, provide ribs or other structural features on the article inner surface 132 or article outer surface 133 to provide for improved strength and/or flexibility to all or parts of the article 100.

The predetermined feature 105 can be registered with any label 115, pigment, texture, graphic, or any other textural or aesthetic feature of the article 100. For example, it may be desirable to provide the article 100 with a region of visual depth, or a texture 110 in a particular location to help enhance another feature of the article 100. To do so, the texture 110 and/or other aesthetic feature 112 can be registered or provided in a pre-determined location such that the texture 110 and/or aesthetic feature 112 is located in the desired location on the final article 100. Additionally, the present invention can provide the additional benefit of not having to register labels and/or printing with certain areas on the article 100 because the predetermined feature 105 can be provided while still allowing for a generally smooth outer surface 133. Thus, it may provide a more cost efficient and effective to present articles 100 for labeling or further decoration, etc. than similar articles with rough or uneven outer surfaces.

The pattern 54 etched onto the perform 10 can be designed so as to provide the predetermined feature 105 on the article 100 after any distortion that may result from the blowing of the perform 10 into the finished article 100. For example, some or all of the features, patterns, indicia and the like comprising a predetermined pattern 54 on the article 100 may be etched on the perform 10 in a pattern that is distorted relative to its desired finished appearance, so that the features, patterns, indicia and the like acquire their desired finished appearance upon being formed into the three-dimensional article 100. Such pre-distortion printing may be useful for indicia such as logos, diagrams, bar-codes, and other images that require precision in order to perform their intended function.

Performs 10 and articles 100 according to the invention can comprise layers and/or materials in layers with various functionalities. For example, an article 100 may have a barrier material layer or a recycled material layer between an outer thermoplastic layer and an inner thermoplastic layer. The article 100 may comprise, for example, additives typically in an amount of from 0.0001%, 0.001% or 0.01% to about 1%, 5% or 9%, by weight of the article. Non-limiting examples of functional materials include, but are not limited, to titanium dioxide, filler, cure agent, anti-statics, lubricant, UV stabilizer, anti-oxidant, anti-block agent, catalyst stabilizer, colorants, pigments, nucleating agent, and a combination thereof.

Figure 8:
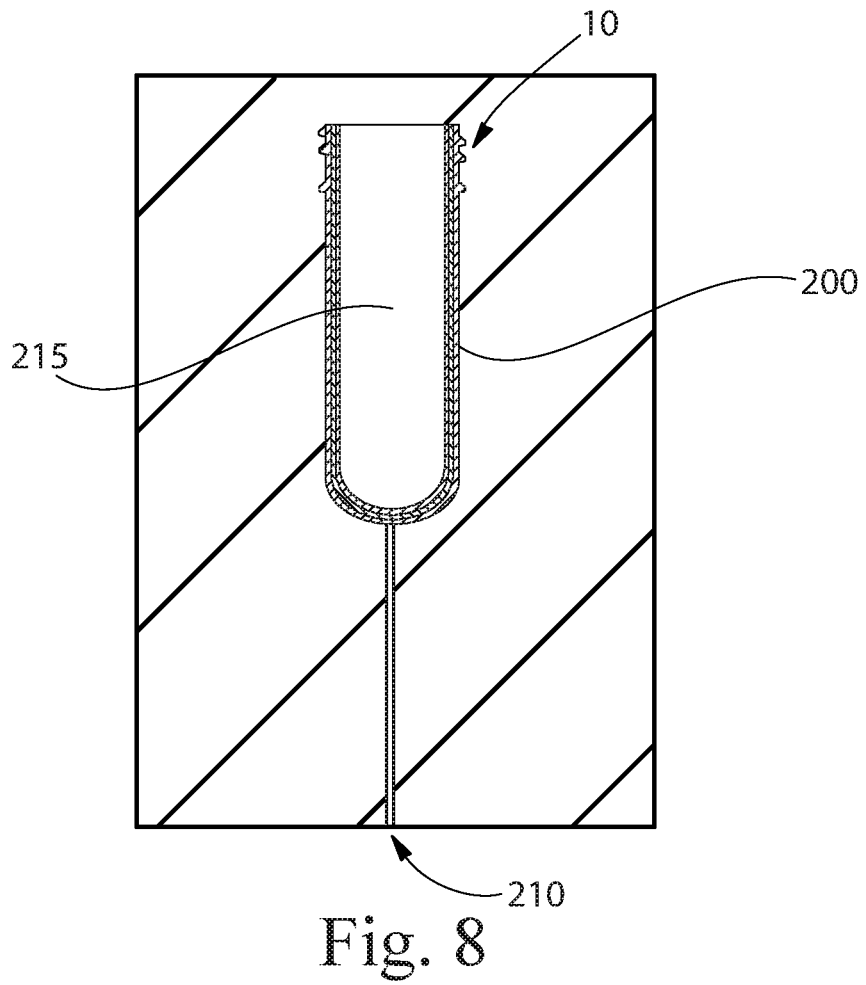
FIG. 8 is a cross-sectional view of an exemplary mold for forming an injection-molded perform.

Method of Making Blow Molded Article:

As noted above, the article 100 of the present invention can be made by any known blow molding method, including IBM and ISBM. In such methods, the article 100 is formed from a perform 10, such as the one shown in FIG. 1. The perform 10 can be made by any known method, including injection, 3D printing or any other suitable method. FIG. 8 shows an example of a perform 10 in an injection perform mold 200 after the material making up the perform 10 has been injected into the perform mold cavity 215 of the perform mold 200 and the perform 10 has been formed into the desired shape. The material making up the perform 10 is injected into the mold through orifice 210. After the material is cooled or otherwise modified such that the perform 10 can maintain its shape, the perform 10 is removed from the mold 200. The perform 10 may be subjected to any number of post-molding techniques, including, but not limited to chemical treatments, heating, cooling, light, mechanical manipulation, such as, for example, cutting, etching, scraping, bending, coating, etc. These techniques can help provide the perform 10 and/or final article 100 formed from the perform 10 desired properties.

Figure 9:
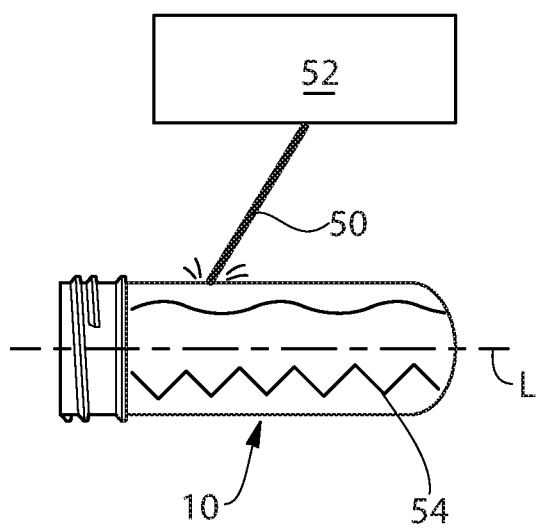
FIG. 9 is a perspective view of a perform being etched by a laser.

In accordance with the present invention, the outer surface 33 of the perform 10 may be provided with a perform texture, such as, for example, in a pattern such as predetermined pattern 54. Although the perform texture could be provided by the perform mold 200, as noted above, such processes are very limited in the perform textures that they can create due to the requirement that the perform 10 be removed from the mold 200. As such, it is preferred that the perform 10 be provided with the perform texture after it is removed from the mold 200. As shown in FIG. 9, the perform 10 may be laser-etched by one or more lasers 52. The laser(s) 52 can direct one or more laser beams 50 to modify or remove a portion of the outer surface 33 of the perform 10. The material ablated or removed can create a pattern and/or a perform texture on the outer surface 33 of the perform 10. The predetermined pattern 54 or perform texture can include any number of lines, shapes, dots, curves, indicia, letters or combinations thereof. Any portion of the outer surface 33 of the perform may be laser-etched or otherwise modified and the modification process can take place at one time or in multiple different steps. The perform 10 may be rotated about its longitudinal axis L during etching to allow the etching device to etch the outer surface 33 about the circumference of the perform 10 or the etching device may be rotated about the perform 10, or both can be rotated.

Figure 10:
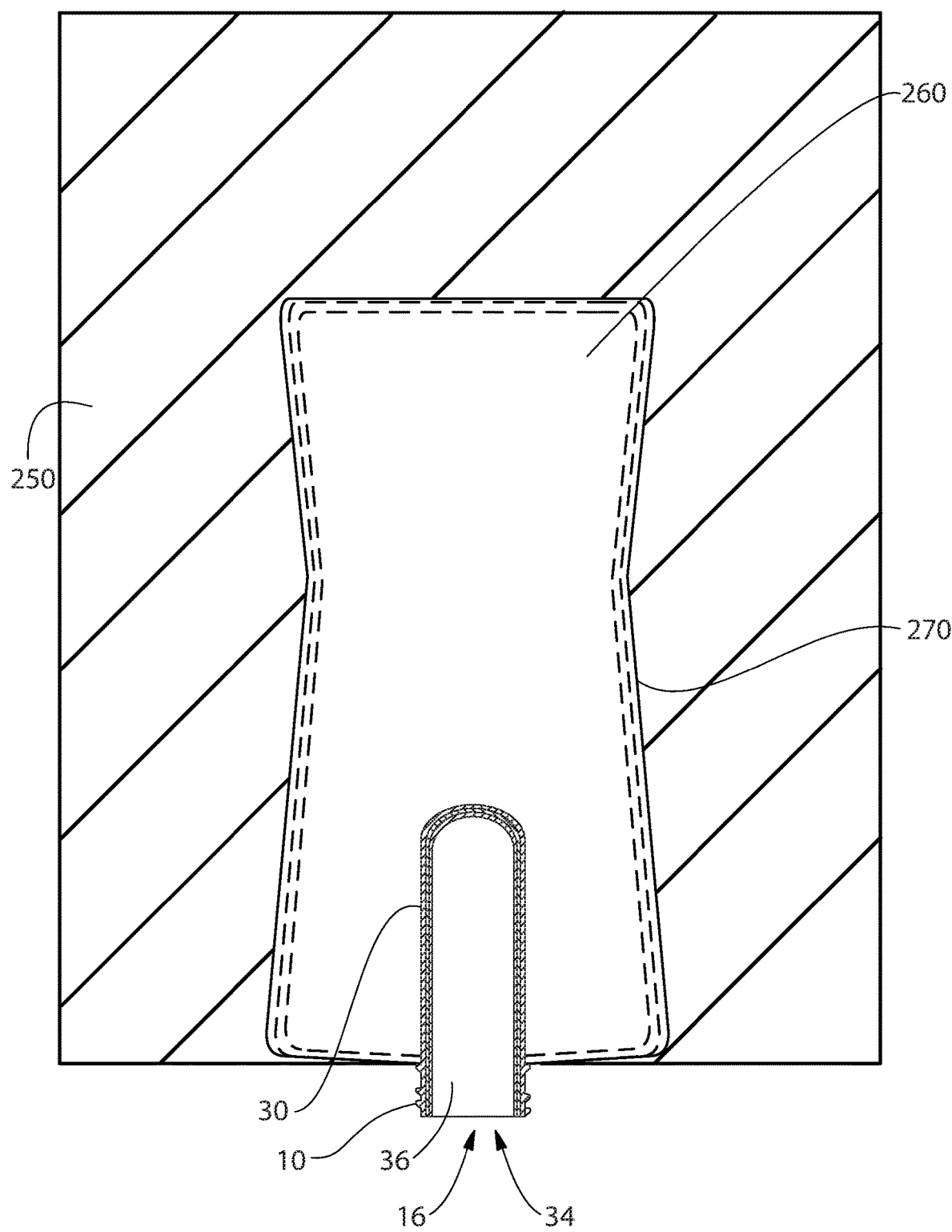
FIG. 10 is a cross-sectional view of a blow mold in accordance with the present invention.

Once the desired perform texture or pattern is applied to the perform 10, the perform may be moved to a blow molding step to form the final article 100 or may be stored or otherwise treated for different properties. Generally, just prior to the blow molding step, the perform 10 is heated or otherwise treated to soften it from a hardened state. This allows the perform 10 to be more easily blown into the shape of the final article 100. Often, the perform is heated by lamps, hot air, radiation or convection, but other methods of heating the perform 10 can be used. When the perform 10 is ready to be "blown" or expanded into the shape of the final article 100, it is placed into a blow mold, such as for example, the one shown in FIG. 10. The blow mold 250 has a cavity 260 formed by walls 270. The cavity 260 is the shape of the final article 100. The walls 270 may be smooth or may have some texture. The perform 10 in the mold 250 is expanded such that the walls 30 of the perform 10 contact the walls 270 of the blow mold 250 and take the shape of the cavity 260. Generally, the perform 10 is expanded by forcing air or another fluid into the opening 34 of the perform through the open end 16 of the perform. If desired, a vacuum created in the cavity 260 can assist the expansion of the perform 10. Once the perform 10 is expanded into the shape of the mold 250 and thus, the final article 100, the article 100 can be cooled and the blow mold 250 can be removed. The article 100 can be subjected to additional processing steps, including but not limited to inspection, removal of imperfections, cleaning, filling, labeling, printing, and sealing.

It is possible to configure the blowing process such that some or all of the perform texture creates a texture 110 of the article 100. Surprisingly, the blow molding process can be configured to create the texture 110 on the inner surface 132 of the article 100, the opposite surface of the wall 150 where it was originally etched or otherwise created. This is especially surprising for thermal etching on the external surface of the perform 10. In order to reach temperatures sufficient for thermal ablation and material vaporization, typically a zone of melted or heat affected material is generated. This melted or heat affected zone can create thermally induced crystallization on the external surface. Crystallized material resists stretching and reforming to the surface of the blow cavity and tends to rebound from the surface of the blow mold. In order to create a smooth outer surface 133, the amount of thermal crystallization on the external surface should be controlled (via efficient ablation on the external surface), the blowing parameters need to be optimized to 1) minimize additional thermal and strain induced crystallization on the external surface and 2) Set the material in the mold to avoid concave or convex surfaces in the transition from thick to thin surfaces (see chart that describes blow molding parameters that enable this).

For example, if the perform 10 was laser-etched on the outer surface 33, the final blow molded article 100 can have a texture 110 corresponding to the laser-etching pattern on its inner surface 132. This transfer of the perform texture to the inner surface 132 of the article 100 can allow the article 100 to have unique and aesthetically pleasing features compared to previously known blow molded articles 100. One example, as described in more detail above, is a bottle having a smooth article outer surface and an aesthetic feature 112 that gives the appearance of thickness, depth and/or texture to the bottle. Such aesthetic features can make the bottle more attractive and more consumer preferred. Additionally, because the article 100 can be provided with a smooth article outer surface 133, it can be more easily labeled and/or have printing applied thereto. Further still, because the method provides a way to add a texture, pattern or functional feature to the perform 10 after it is out of the perform mold 200, it can significantly simplify the process for making complex features on the end article 100. This also allows for the functional, textural and/or aesthetic features of the end article 100 to be changed despite the perform 10 being from the same perform mold 200 and allows for much quicker and more efficient changes to the overall aesthetics, texture or functional features of the article 100 because new perform molds 200 are not needed if it is desired to change the resulting article 100. Thus, small productions batches and even customized articles become economically feasible.

Measurement Methods:

Wall thickness, layer thickness, maximum peak/pit height (Sz), and root mean square roughness (Sq), as used herein, are measured as set forth below.

Wall Thickness

Wall Thickness is measured with a digital micrometer, such as a Shinwa 79523 Digital Micrometer having an accuracy of +/−0.003 mm, at two or more locations in the region of the article where the wall thickness is to be measured.

Layer Thickness

Layer thickness is measured with an industrial microscope, such as Olympus BX Series Optical Microscope having an accuracy of 0.003 mm, at two or more locations in the region of the article where the layer thickness is measured.

Sz—Maximum Peak/Pit Height:

Sz, the Maximum Peak/Pit Height, is measured using a 3D Laser Scanning Confocal Microscope such as a Keyence VK-X200 series microscope available from KEYENCE CORPORATION OF AMERICA) which includes a VK-X200K controller and a VK-X210 Measuring Unit. The instrument manufacturer's software, VK Viewer version 2.4.1.0, is used for data collection and the manufacturer's software, Multifile Analyzer version 1.1.14.62 and VK Analyzer version 3.4.0.1, are used for data analysis. If needed, the manufacturer's image stitching software, VK Image Stitching version 2.1.0.0, can be used. The manufacturer's analysis software is compliant with ISO 25178. The light source used is a semiconductor laser with a wavelength of 408 nm and having a power of about 0.95 mW.

The sample to be analyzed is obtained by cutting a piece of the article out of the article that includes the region to be analyzed in a size that can fit the microscope for proper analysis. To measure Sz of an article with etched and non-etched regions 113, a sample should be obtained that includes both the etched and non-etched regions 113. The analysis should take place over both the etched and non-etched regions 113. If the etched region has one axis that is longer than another, the long axis of the etched region to be measured should be oriented approximately perpendicular to the long axis of the image region. If the sample is not flat, but flexible, the sample may be flattened and held down on the microscope stage with tape or other means. If, due to the shape, flexibility or other characteristic of the sample, measurements will be more accurate when the sample is not flattened, corrections may be used, as explained hereinbelow.

Sz is obtained by acquiring and stitching together several contiguous images of the sample in the region of interest (e.g. a region including both etched and non-etched areas). The images are collected using 10× objective lens suitable for non-contact profilometry such as a 10× Nikon CF IC Epi Plan DI Interferometry Objective with a numerical aperture of 0.30, giving an image area of approximately 1430×1075 micrometers per image. The images are automatically stitched using the manufacturer's "VK Image Stitching" software. Data is acquired from the images using the acquisition software's "Expert Mode" wherein the following parameters are set as described herein: 1) Height Scan Range is set to encompass the height range of the sample (this can vary from sample to sample depending on the surface topography of each); 2) Z-direction step size is set to 2.0 micrometers; 3) Real Peak Detection mode is set to "On"; and 4) Laser Intensity and Detector Gain are optimized for each sample using the autogain feature of the instrument control software.

Prior to analysis, the data is subjected to the following corrections using the manufacturer's Multifile Analyzer software: 1) 3×3 median smoothing in which the center pixel of a 3×3 pixel array is replaced by the median value of that array; 2) noise removal using strong height cut (following built in algorithm in the analysis software), and 3) shape correction using the simplest method (plane, second order curve or waveform removal) sufficient to remove the shape of the surface. Regions including foreign materials, artifacts of the sample harvesting process or any other obvious abnormalities should be excluded from analysis and alternative samples should be used any sample can't be accurately measured. The shape of the surface is removed using the Waveform Removal method of the Surface Shape Correction tool. The cutoff wavelength is specified to be approximately five times the size of the largest structure to be preserved. The Reference Plane is specified using the Set Area method and selecting the same area as is used for the shape removal. The resulting value is the Sz for the measured portion of the article.

Root Mean Square Roughness (Sq)

Root Mean Square Roughness, Sq, is measured using a 3D Laser Scanning Confocal Microscope such as a Keyence VK-X200 series microscope available from KEYENCE CORPORATION OF AMERICA) which includes a VK-X200K controller and a VK-X210 Measuring Unit. The instrument manufacturer's software, VK Viewer version 2.4.1.0, is used for data collection and the manufacturer's software, Multifile Analyzer version 1.1.14.62 and VK Analyzer version 3.4.0.1, are used for data analysis. If needed, the manufacturer's image stitching software, VK Image Stitching version 2.1.0.0, can be used. The manufacturer's analysis software is compliant with ISO 25178. The light source used is a semiconductor laser with a wavelength of 408 nm and having a power of about 0.95 mW.

The sample to be analyzed is obtained by cutting a piece of the article out of the article that includes the region to be analyzed in a size that can fit the microscope for proper analysis. To measure Sq of an etched portion of an article, a sample should be obtained that includes an etched region and the analysis should take place only over the portion of the sample that is etched. If the sample is not flat, but is flexible, the sample may be held down on the microscope stage with tape or other means. If, due to the shape, flexibility or other characteristic of the sample, measurements will be more accurate when the sample is not flattened, corrections may be sued, as explained hereinbelow.

The measurement data from the sample is obtained using a 20× objective lens suitable for non-contact profilometry, such as a 20× Nikon CF IC Epi Plan DI Interferometry Objective with a numerical aperture of 0.40. The data is acquired using the acquisition software's "Expert Mode", with the following parameters set as described he: 1) Height Scan Range is set to encompass the height range of the sample (this can vary from sample to sample depending on the surface topography of each); 2) Z-direction Step Size is set to 0.50 micrometers; 3) Real Peak Detection mode is set to "On"; and 4) Laser Intensity and Detector Gain are optimized for each sample using the autogain feature of the instrument control software.

Prior to analysis, the data is subjected to the following corrections using the manufacturer's Multifile Analyzer software: 1) 3×3 median smoothing in which the center pixel of a 3×3 pixel array is replaced by the median value of that array; 2) noise removal using weak height cut (following built in algorithm in the analysis software), and 3) shape correction using waveform removal (0.5 mm cutoff). The Reference Plane is specified using the Set Area method and selecting the same area as is used for the shape removal. Regions including foreign materials, artifacts of the sample harvesting process or any other obvious abnormalities should be excluded from analysis and alternative samples should be used any sample can't be accurately measured. The resulting value is the Root Mean Square Roughness, Sq, for the measured portion of the sample.

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere pressure and at about 50% relative humidity.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-layer preform for blow molding formed from a thermoplastic material, the preform comprising:
    a body having one or more walls and an opening, wherein at least a portion of the body includes an etched portion having at least some of the thermoplastic material removed in a predetermined pattern wherein the etched portion is etched by thermal-etching.

2. The preform of claim 1 wherein the etching is performed by a laser.

3. The preform of claim 1 wherein the one or more walls of the preform have an outer layer and an inner layer, each having a thickness, and wherein the etching has a depth that is less than or equal to the thickness of the outer layer.

4. The preform of claim 1 wherein the one or more walls of the preform have an outer layer and an inner layer, and wherein the outer layer is translucent or transparent.

5. The preform of claim 1 wherein the one or more walls of the preform have an outer layer and an inner layer, each having a thickness, and wherein the etching has a depth that is greater than or equal to the thickness of the outer layer.

6. The preform of claim 1 wherein the one or more walls of the preform have an outer layer and an inner layer, the inner layer being different from the outer layer in at least one of the following: thickness, materials, colors, levels of translucency.

\* \* \* \* \*